United States Patent
Allen et al.

(10) Patent No.: US 10,694,743 B2
(45) Date of Patent: Jun. 30, 2020

(54) AGRICULTURAL COMPOSITIONS WITH REDUCED AQUATIC TOXICITY

(71) Applicant: Stepan Company, Northfield, IL (US)

(72) Inventors: Dave R. Allen, Chicago, IL (US); Andrew D. Malec, Irvine, CA (US)

(73) Assignee: STEPAN COMPANY, Northfield, IL (US)

( * ) Notice: Subject to any disclaimer, the term of this patent is extended or adjusted under 35 U.S.C. 154(b) by 200 days.

(21) Appl. No.: 15/323,188

(22) PCT Filed: Jun. 9, 2015

(86) PCT No.: PCT/US2015/034785
§ 371 (c)(1),
(2) Date: Dec. 30, 2016

(87) PCT Pub. No.: WO2016/003607
PCT Pub. Date: Jan. 7, 2016

(65) Prior Publication Data
US 2017/0142963 A1    May 25, 2017

Related U.S. Application Data

(60) Provisional application No. 62/020,331, filed on Jul. 2, 2014.

(51) Int. Cl.
*A01N 25/30*    (2006.01)
*A01N 57/12*    (2006.01)

(52) U.S. Cl.
CPC ............. *A01N 25/30* (2013.01); *A01N 57/12* (2013.01)

(58) Field of Classification Search
CPC .................................. A01N 25/30; A01N 57/12
See application file for complete search history.

(56) References Cited

U.S. PATENT DOCUMENTS

| | | |
|---|---|---|
| 2,865,968 A | 5/1955 | Hansley et al. |
| 3,193,586 A | 7/1965 | Rittmeister et al. |
| 3,497,555 A | 2/1970 | Dudzinski et al. |
| 4,140,513 A | 2/1979 | Prill |
| 4,313,847 A | 2/1982 | Chasin et al. |
| 4,405,531 A | 9/1983 | Franz |
| 4,409,399 A | 10/1983 | Swift et al. |
| 4,556,410 A | 12/1985 | Ronning et al. |
| 4,557,751 A | 12/1985 | Ronning et al. |
| 4,594,455 A | 6/1986 | Dudzinski |
| 4,965,403 A | 10/1990 | Fields, Jr. et al. |
| 4,994,622 A | 2/1991 | Fong et al. |
| 5,124,491 A | 6/1992 | Fleckenstein et al. |
| 5,236,900 A | 8/1993 | Cooper et al. |
| 5,668,085 A * | 9/1997 | Forbes .................. A01N 57/20 504/206 |
| 5,696,294 A | 12/1997 | Abe et al. |
| 5,710,103 A | 1/1998 | Magin et al. |
| 5,750,468 A | 5/1998 | Wright et al. |
| 5,952,517 A | 9/1999 | Ries et al. |
| 6,277,788 B1 | 8/2001 | Wright |
| 6,683,224 B1 | 1/2004 | Hourticolon et al. |
| 7,049,270 B2 | 5/2006 | Lennon et al. |
| 7,135,437 B2 | 11/2006 | Pallas et al. |
| 7,208,643 B2 | 4/2007 | Namba et al. |
| 7,316,990 B2 | 1/2008 | Tank et al. |
| 8,455,396 B2 | 6/2013 | Malec |
| 8,481,747 B2 | 7/2013 | Schrodi |
| 8,569,560 B2 | 10/2013 | Schrodi et al. |
| 2005/0170965 A1 | 8/2005 | Bramati et al. |
| 2007/0049498 A1 | 3/2007 | Brigance et al. |
| 2009/0318294 A1 | 12/2009 | Malec et al. |
| 2012/0040833 A1* | 2/2012 | Kisenwether .......... A01N 25/30 504/206 |
| 2013/0225408 A1* | 8/2013 | Allen ..................... C04B 28/14 504/206 |

FOREIGN PATENT DOCUMENTS

| | | |
|---|---|---|
| DE | 2517374 A1 | 11/1975 |
| WO | 2012/061095 A1 | 5/2012 |
| WO | 2012/061098 A1 | 5/2012 |

OTHER PUBLICATIONS

PCT International Search Report and Written Opinion dated Aug. 24, 2015 from corresponding Application No. PCT/US2015/034785 filed Jun. 9, 2015.

* cited by examiner

*Primary Examiner* — Johann R Richter
*Assistant Examiner* — Danielle Sullivan
(74) *Attorney, Agent, or Firm* — Dilworth IP, LLC

(57) ABSTRACT

Agricultural compositions having reduced aquatic toxicity are disclosed. The compositions comprise an agricultural active, a monounsaturated $C_{10}$-$C_{12}$ fatty amine ethoxylate, and optionally water. The compositions may further comprise an auxiliary surfactant, a solvent, or both. In certain preferred aspects, the agricultural active is a glyphosate salt. Agricultural compositions comprising a monounsaturated $C_{10}$-$C_{12}$ fatty amine ethoxylate have good herbicidal efficacy. Unexpectedly, the monounsaturated $C_{10}$-$C_{12}$ fatty amine ethoxylates have reduced aquatic toxicity when compared with their saturated analogs.

16 Claims, No Drawings

AGRICULTURAL COMPOSITIONS WITH REDUCED AQUATIC TOXICITY

FIELD OF THE INVENTION

The invention relates to agricultural compositions having reduced aquatic toxicity. The compositions include a monounsaturated fatty amine ethoxylate.

BACKGROUND OF THE INVENTION

Ethoxylated fatty amine surfactants are well-known adjuvants for agricultural applications. Numerous companies supply ethoxylated fatty amines, including Stepan Company (TOXIMUL® series of products), Air Products (Tomamine® products), Akzo-Nobel (Ethomeen® products), Huntsman (Surfonic® T, Teric® M, and Empilan® AM products), and others. Many of the commercial materials are ethoxylated tallow amines, where the fatty chains are principally linear and saturated $C_{14}$-$C_{18}$ groups. Methods for making saturated ethoxylated fatty amines are straightforward (see, e.g., U.S. Pat. No. 4,313,847) and their use in agricultural compositions, particularly glyphosate formulations, is well documented (see, e.g., U.S. Pat. Nos. 5,668,085 and 6,277,788).

Tallowamine ethoxylates have been workhorse surfactants for agricultural use, but they have some drawbacks. For instance, tallowamine ethoxylates cause an undesirable level of eye irritation, which can be a hazard during herbicide application. For at least some applications, ethoxylated etheramine surfactants (see, e.g., U.S. Pat. Nos. 5,750,468 and 8,455,396; and U.S. Publ. No. 2009/0318294) may provide a less-irritating alternative to tallowamine ethoxylates.

Tallowamine ethoxylates are also moderately toxic in aquatic invertebrate acute toxicity tests, so less-toxic alternatives are needed. Ideally, such a reduction in aquatic toxicity could be realized without sacrificing herbicidal efficacy. To address the toxicity concern, formulators often replace at least a portion of the tallowamine ethoxylate with another surfactant or additive. For instance, U.S. Publ. No. 2007/0049498 counsels to replace a portion of the tallowamine ethoxylate with glycerin to reduce the degree of aquatic toxicity and eye irritation.

Improvements in metathesis technology have led to the availability of commercial fatty acid (or ester) feedstocks having monounsaturation and reduced chain length ($C_{10}$-$C_{17}$), as taught in U.S. Pat. Nos. 8,569,560 and 8,481,747. The feedstocks are usually prepared by cross-metathesizing short-chain olefins with natural oils. The acid or ester feedstocks are sensible starting materials for preparing the corresponding fatty amines and ethoxylated fatty amines. Prior to the availability of metathesis-based feeds, the synthesis of monounsaturated fatty amines was usually a non-trivial, multi-step proposition (see, e.g., U.S. Pat. No. 5,236,900). However, some shorter-chain fatty acids are available by non-metathesis routes. For instance, 10-undecenoic acid, a precursor to a $C_{11}$ monounsaturated amine ethoxylate, is available economically in large quantity from castor oil pyrolysis (see, e.g., U.S. Pat. No. 5,952,517).

The agricultural industry would benefit from the availability of surfactant compositions having reduced aquatic toxicity. Valuable compositions would effectively solubilize glyphosate or other important agricultural active materials and could be used in high-load formulations. Ideally, the reduced aquatic toxicity would not be achieved at the expense of herbicidal efficacy.

SUMMARY OF THE INVENTION

The invention relates to agricultural compositions having reduced aquatic toxicity. The compositions comprise an agricultural active, a monounsaturated $C_{10}$-$C_{12}$ fatty amine ethoxylate, and optionally water. The compositions may further comprise an auxiliary surfactant, a solvent, or both. In certain preferred aspects, the agricultural active is a glyphosate salt. Agricultural compositions comprising a monounsaturated $C_{10}$-$C_{12}$ fatty amine ethoxylate have good herbicidal efficacy. Unexpectedly, the monounsaturated $C_{10}$-$C_{12}$ fatty amine ethoxylates have reduced aquatic toxicity when compared with their saturated analogs, so agricultural compositions comprising the amine ethoxylates also have reduced toxicity.

DETAILED DESCRIPTION OF THE INVENTION

The inventive compositions include at least one agricultural active. Suitable agricultural actives may be herbicides, fungicides, bactericides, acaricides, insecticides, nematicides, plant-growth regulators, or the like, or combinations thereof.

Suitable herbicides include, for example, anilides, such as diflufenican and propanil; aryl carboxylic acids, such as dichloropicolinic acid, dicamba and picloram; aryloxyalkanoic acids, such as 2,4-D, 2,4-DB, 2,4-DP, fluoroxypyr, MCPA, MCPP and triclopyr; aryloxy-phenoxy-alkanoic acid esters, such as diclofop-methyl, fenoxaprop-ethyl, fluazifop-butyl, haloxyfop-methyl and quizalofop-ethyl; azinones, such as chloridazon and norflurazon; carbamates, such as chlorpropham, desmedipham, phenmedipham and propham; chloroacetanilides, such as alachlor, acetochlor, butachlor, metazachlor, metolachlor, pretilachlor and propachlor; dinitroanilines, such as oryzalin, pendimethalin and trifluralin; diphenyl ethers, such as acifluorfen, bifenox, fluoroglycofen, fomesafen, halosafen, lactofen and oxyfluorfen; ureas, such as chlortoluron, diuron, fluometuron, isoproturon, linuron and methabenzthiazuron; hydroxylamines, such as alloxydim, clethodim, cycloxydim, sethoxydim and tralkoxydim; imidazolinones, such as imazethapyr, imazamethabenz, imazapyr and imazaquin; nitriles, such as bromoxynil, dichlobenile and ioxynil; oxyacetamides, such as mefenacet; sulfonylureas, such as amidosulfuron, bensulfuron methyl, chlorimuron ethyl, chlorsulfuron, cinosulfuron, metsulfuron-methyl, nicosulfuron, primisulfuron, pyrazosulfuron-ethyl, thifensulfuron-methyl, triasulfuron and tribenuron-methyl; thiolcarbamates, such as butylates, cycloates, diallates, EPTC, esprocarb, molinates prosulfocarb, thiobencarb and triallates; triazines, such as atrazine, cyanazine, simazine, simetryne, terbutryne and terbutylazine; triazinones, such as hexazinone, metamitron and metribuzin; others, such as aminotriazoles, benfuresates, bentazones, cinmethylin, clomazone, clopyralid, difenzoquat, dithiopyr, ethofumesate, fluorochloridone, glufosinate, glyphosate, isoxaben, pyridate, quinchlorac, quinmerac, sulfosate, tridiphane, and the like, and combinations thereof. Glyphosate is particularly preferred.

Suitable fungicides include, for example, 2-aminobutane; 2-anilino-4'-methyl-6-cyclopropyl-pyrimidine; 2',6'-dibromo-2-methyl-4'-trifluoromethoxy-4'-trifluoro-methyl-1,3-thiazole-5-carboxanilide; 2,6-dichloro-N-(4-trifluoromethylbenzyl)-benzamide; (E)-2-methoxyimino-N-methyl-2-

(2-phenoxyphenyl)-acetamide; 8-hydroxyquinoline sulfate; methyl (E)-2-2-[6-(2-cyanophenoxy)-pyrimidine-4-yloxy]-phenyl-3-methoxyacrylate; methyl-(E)-methoximino-[alpha-(o-tolyloxy)-o-tolyl]-acetate; 2-phenylphenol (OPP), aldimorph, ampropylfos, anilazine, azaconazole, benalaxyl, benodanil, benomyl, binapacryl, biphenyl, bitertanol, blasticidin S, bromuconazole, bupirimate, buthiobate, calcium polysulfide, captafol, captan, carbendazim, carboxin, quinomethionate, chloroneb, chloropicrin, chlorothalonil, chlozolinate, cufraneb, cymoxanil, cyproconazole, cyprofuram, dichlorophen, diclobutrazol, dichlofluanid, diclomezine, dicloran, diethofencarb, difenoconazole, dimethirimol, dimethomorph, diniconazole, dinocap, diphenylamine, dipyrithion, ditalimfos, dithianon, dodine, drazoxolon, edifenphos, epoxyconazole, ethirimol, etridiazole, fenarimol, fenbuconazole, fenfuram, fenitropane, fenpiclonil, fenpropidin, fenpropimorph, fentin acetate, fentin hydroxide, ferbam, ferimzone, fluazinam, fludioxonil, fluoromide, fluquinconazole, flusilazole, flusulfamide, flutolanil, flutriafol, folpet, fosetyl-aluminum, fthalide, fuberidazole, furalaxyl, furmecyclox, guazatine, hexachlorobenzene, hexaconazole, hymexazol, imazalil, imibenconazole, iminoctadine, iprobenfos, iprodione, isoprothiolane, kasugamycin, copper preparations such as: copper hydroxide, copper naphthenate, copper oxychloride, copper sulfate, copper oxide, oxine-copper and Bordeaux mixture, mancopper, mancozeb, maneb, mepanipyrim, mepronil, metalaxyl, metconazole, methasulfocarb, methfuroxam, metiram, metsulfovax, myclobutanil, nickel dimethyldithiocarbamate, nitrothal isopropyl, nuarimol, ofurace, oxadixyl, oxamocarb, oxycarboxin, pefurazoate, penconazole, pencycuron, phosdiphen, pimaricin, piperalin, polyoxin, probenazole, prochloraz, procymidone, propamocarb, propiconazole, propineb, pyrazophos, pyrifenox, pyrimethanil, pyroquilone, quintozene (PCNB), sulfur and sulfur preparations, tebuconazole, tecloftalam, tecnazene, tetraconazole, thiabendazole, thicyofen, thiophanate-methyl, thiram, tolclofos-methyl, tolylfluanide, triadimefon, triadimenol, triazoxide, trichlamide, tricyclazol, tridemorph, triflumizole, triforine, triticonazole, validamycin A, vinclozolin, zineb, ziram, 8-tert.-butyl-2-(N-ethyl-N-n-propyl-amino)-methyl-1,4-dioxa-spiro-[4,5]decane, N—(R)-(1-(4-chlorophenyl)-ethyl)-2,2-dichlor-1-ethyl-3t-methyl-1 r-cyclopropanecarboxylic acid amide (diastereomeric mixture or occasional or individual isomers), [2-methyl-1-[[[1(4-methylphenyl)-ethyl]-amino]-carbonyl]-propyl]-carbamine acid 1-methylethylester and 1-methyl-cyclohexyl-1-carboxylic acid-(2,3-dichlor-4-hydroxy)-anilide, and the like, and combinations thereof.

Suitable bactericides, include, for example, bronopol, dichlorophen, nitrapyrin, nickel dimethyldithiocarbamate, kasugamycin, octhilinone, furan carboxylic acid, oxytetracycline, probenazole, streptomycin, tecloftalam, copper sulfate and other copper preparations, and the like, and combinations thereof.

Suitable acaricides, insecticides and nematicides include, for example, abamectin, acephate, acrinathrin, alanycarb, aldicarb, alphamethrin, amitraz, avermectin, AZ 60541, azadirachtin, azinphos A, azinphos M, azocyclotin, Bacillus thuringiensis, bendiocarb, benfuracarb, bensultap, betacyfluthrin, bifenthrin, BPMC, brofenprox, 4-bromo-2-(4-chlorphenyl)-1-(ethoxymethyl)-5-(trifluoromethyl)-1H-pyrrole-3-carbonitrile, bromophos A, bufencarb, buprofezin, butocarboxin, butylpyridaben, cadusafos, carbaryl, carbofuran, carbophenothion, carbosulfan, cartap, chloethocarb, chloretoxyfos, chlorfenvinphos, chlorfluazuron, chlormephos, N-[(6-chloro-3-pyridinyl)-methyl]-N'-cyano-N-methyl-ethanimidamide, chlorpyrifos, chlorpyrifos M, cis-resmethrin, clocythrin, clofentezine, cyanophos, cycloprothrin, cyfluthrin, cyhalothrin, cyhexatin, cypermethrin, cyromazine, deltamethrin, demeton-M, demeton-S, demeton-S-methyl, diafenthiuron, diazinon, dichlofenthion, dichlorvos, dicliphos, dicrotophos, diethion, diflubenzuron, dihalogenpropene compounds, dimethoate, dimethylvinphos, dioxathion, disulfoton, edifenphos, emamectin, esfenvalerate, ethiofencarb, ethion, ethofenprox, ethoprophos, etrimphos, fenamiphos, fenazaquin, fenbutatin oxide, fenitrothion, fenobucarb, fenothiocarb, fenoxycarb, fenpropathrin, fenpyrad, fenpyroximate, fenthion, fenvalerate, fipronil, fluazinam, fluazuron, flucycloxuron, flucythrinate, flufenoxuron, flufenprox, fluvalinate, fonophos, formothion, fosthiazate, fubfenprox, furathiocarb, HCH, heptenophos, hexaflumuron, hexythiazox, imidacloprid, iprobenfos, isazophos, isofenphos, isoprocarb, isoxathion, ivermectin, lambda-cyhalothrin, lufenuron, malathion, mecarbam, mevinphos, mesulfenphos, metaldehyde, methacrifos, methamidophos, methidathion, methiocarb, methomyl, metolcarb, milbemectin, monocrotophos, moxidectin, naled, NC 184, nitenpyram, omethoate, oxamyl, oxydemethon M, oxydeprofos, parathion A, parathion M, permethrin, phenthoate, phorate, phosalone, phosmet, phosphamidon, phoxim, pirimicarb, pirimiphos M, pirimiphos A, profenophos, promecarb, propaphos, propoxur, prothiophos, prothoate, pymetrozin, pyrachlophos, pyrazolyl benzyl ether, pyrazole derivatives, pyridaphenthion, pyresmethrin, pyrethrum, pyridaben, pyrimidifen, pyriproxifen, quinalphos, salithion, sebufos, silafluofen, substituted propargylamines, sulfotep, sulprofos, tebufenozide, tebufenpyrad, tebupirimiphos, teflubenzuron, tefluthrin, temephos, terbam, terbufos, tetrachlorvinphos, thiafenox, thiodicarb, thiofanox, thiomethon, thionazin, thuringiensin, tralomethrin, triarathen, triazophos, triazuron, trichlorfon, triflumuron, trimethacarb, vamidothion, XMC, xylylcarb, zetamethrin, and the like, and combinations thereof.

Suitable plant-growth regulators include, for example, chlorocholine chloride, ethephon, and the like, and combinations thereof.

The amount of agricultural active present will depend on the nature of the agricultural active, the particular monounsaturated $C_{10}$-$C_{12}$ fatty amine ethoxylate used, the identity and amount of any auxiliary surfactants or solvents used, whether or not the composition is a concentrate, and other factors. Generally, when the agricultural composition is a concentrate, the agricultural active will be present in an amount within the range of 20 to 98 wt. %, preferably 30 to 95 wt. %, more preferably 50 to 93 wt. %, based on the total amount of agricultural composition. When the agricultural composition is diluted with water for field application, the agricultural active is preferably present in an amount within the range of 1 ppm to 10 wt. %, more preferably 10 ppm to 1 wt. %.

In a preferred aspect, the agricultural active is a glyphosate salt. Glyphosate acid is commercially available and can come from any desired source. One common commercial material is supplied at about 90.5% glyphosate acid. A basic compound (e.g., an alkali metal hydroxide, an alkali metal carbonate, or an amine) is ordinarily added with appropriate cooling to the aqueous glyphosate acid slurry with good mixing to generate the glyphosate concentrate. Suitable glyphosate salts include alkali metal salts (lithium, sodium, potassium), ammonium salts, salts of alkylamines (methylamine, ethylamine, isopropylamine salts), salts of alkanolamines (ethanolamine, dimethylethanolamine), and the like. For additional examples, see U.S. Pat. Nos. 7,316,990;

7,049,270; 6,277,788; 4,965,403; 4,405,531; and 4,140,513, the teachings of which are incorporated herein by reference.

Preferred glyphosate formulations comprise at least 30 wt. % acid equivalents, more preferably at least 36 wt. % acid equivalents, and most preferably at least 39 wt. % acid equivalents, of the glyphosate salt. Preferably, the glyphosate salt comprises an alkali metal, more preferably sodium or potassium, and most preferably potassium. For potassium glyphosate, 39 wt. % acid equivalents (or 39 wt. % "a.e.") corresponds to about 48 wt. % of the potassium salt because the potassium salt has a higher molecular weight than the acid by a factor of about 1.23. Thus, it takes about 23% by weight more of the potassium salt to deliver the same amount of glyphosate acid as would be provided by the pure acid. Advantages of using the aqueous salt of glyphosate are ease of transportation, handling, and end use of the product.

In one aspect, the invention relates to a 540 g/L a.e. potassium glyphosate formulation. A typical formulation comprises 82 to 85 wt. %, more preferably 83 to 84 wt. %, of the potassium salt of glyphosate (47.5% a.e.). The formulation also includes an amine ethoxylate (2.4 to 8 wt. %), an optional auxiliary surfactant and/or solvent (0 to 5 wt. %), and water (q.s. to 100%).

In another aspect, the invention relates to a 360 g/L a.e. isopropylamine glyphosate formulation. A typical formulation comprises 64 to 68 wt. %, more preferably 65 to 67 wt. %, of the isopropylamine salt of glyphosate (62% a.e.). The formulation also includes an amine ethoxylate (4.5 to 12 wt. %), an optional auxiliary surfactant and/or solvent (0 to 7.3 wt. %), and water (q.s. to 100%).

The inventive agricultural compositions comprise a monounsaturated $C_{10}$-$C_{12}$ fatty amine ethoxylate. Preferably, the fatty amine ethoxylate is a monounsaturated $C_{11}$ fatty amine ethoxylate. The $C_{11}$ fatty amine ethoxylate is available synthetically from undecenoic acids, undecenyl alcohols, and undecenals. 10-Undecenoic acid can be made by pyrolyzing readily available castor oil. The $C_{10}$-$C_{12}$ fatty amine ethoxylates can also be made from products of natural oil metathesis, such as the $C_{10}$-$C_{12}$ methyl esters generated by cross-metathesizing natural oils with lower olefins such as ethylene or 1-butene (see, e.g., U.S. Pat. Nos. 8,569,560 and 8,481,747 and PCT Int. Appl. Nos. WO 2012/061095 and WO 2012/061098, the teachings of which are incorporated herein by reference).

Unsaturated fatty $C_{10}$-$C_{12}$ acids or esters can be reacted with ammonia to give the corresponding amide. Reduction of the amide to give a primary amine is accomplished using well-known methods, including reactions with a hydride reducing agent (boranes, aluminum hydrides, borohydrides, or the like), or catalytic hydrogenation. Suitable reducing reagents include, for example, borane, borane dimethylsulfide, sodium borohydride/iodine, lithium cyanoborohydride, aluminum hydride, lithium aluminum hydride, diisobutylaluminum hydride, and the like. For additional examples, see R. Larock, *Comprehensive Organic Transformations: A Guide to Functional Group Preparations* (1989), pp. 432-434, and M. Smith and J. March, *March's Advanced Organic Chemistry*, 5$^{th}$ ed. (2001), pp. 1549-1550.

The resulting unsaturated $C_{10}$-$C_{12}$ unsaturated fatty amine can then be reacted with ethylene oxide according to well-known and/or commercially practiced procedures for making amine ethoxylates. The reaction can be uncatalyzed or can be performed in the presence of a catalyst, typically a base such as metallic sodium, potassium hydroxide, or sodium methoxide, or the like. An illustrative procedure appears in the experimental section below.

In an alternative synthetic approach, the unsaturated $C_{10}$-$C_{12}$ fatty amine is made by first reducing an unsaturated $C_{10}$-$C_{12}$ fatty acid or ester to give an unsaturated fatty alcohol, followed by amination of the unsaturated fatty alcohol. The acid or ester derivative is reduced to a fatty alcohol using a metal hydride reagent (sodium borohydride, lithium aluminum hydride, or the like), catalytic hydrogenation, or other well-known techniques for generating the fatty alcohol (see, e.g., U.S. Pat. Nos. 2,865,968; 3,193,586; 5,124,491; 6,683,224; and 7,208,643, the teachings of which are incorporated herein by reference). Amination is then preferably performed in a single step by reacting the fatty alcohol with ammonia in the presence of an amination catalyst. Suitable amination catalysts are well known. Catalysts comprising copper, nickel, and/or alkaline earth metal compounds are common. For suitable catalysts and processes for amination, see U.S. Pat. Nos. 5,696,294; 4,994,622; 4,594,455; 4,409,399; and 3,497,555, the teachings of which are incorporated herein by reference. The resulting unsaturated $C_{10}$-$C_{12}$ fatty amine is then ethoxylated with the desired number of EO units as previously described.

Unsaturated fatty $C_{10}$-$C_{12}$ aldehydes can be converted to unsaturated $C_{10}$-$C_{12}$ fatty amines by reductive amination (see generally Larock, supra, pp. 421-423 and Ahmed F. Abdel-Magid, *Reductions in Organic Synthesis*, especially Chapter 12, A. Abdel-Magid and C. Maryanoff, "Use of Sodium Triacetoxyborohydride in Reductive Amination of Ketones and Aldehydes," pp. 201-216; *J. Org. Chem.* 61 (1996) 3849). Sodium cyanoborohydride in aqueous ammonia/ammonium acetate can also be used (see, e.g., E. Dangerfield et al., *J. Org. Chem.* 75 (2010) 5470).

In some aspects, the fatty amine ethoxylate has the structure:

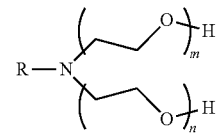

wherein R is linear or branched $C_{10}H_{19}$, $C_{11}H_{21}$, or $C_{12}H_{23}$, each of m and n represents an average number of oxyethylene units, each of m and n is at least 1, and m+n has a value from 2 to 7. Preferably, m+n has a value from 4 to 6. In a preferred aspect, R is $C_{11}H_{21}$ and m+n is 2. In another preferred aspect, R is $C_{11}H_{21}$ and m+n is 5.

The agricultural compositions, when concentrated, preferably comprise 0.1 to 30 wt. %, more preferably 0.5 to 20 wt. %, most preferably 3 to 15 wt. % of the unsaturated $C_{10}$-$C_{12}$ fatty amine. When diluted or in a ready-to-use formulation, the compositions preferably comprise 1 ppm to 10 wt. %, preferably 10 ppm to 1 wt. % of the unsaturated $C_{10}$-$C_{12}$ fatty amine.

The agricultural compositions preferably include water. In some aspects, the compositions are supplied as concentrates, in which case, the amount of water present will be minimized. Concentrates are usually more practical or economical to ship than diluted or fully formulated, ready-to-use products. When the agricultural composition is a concentrate, it preferably comprises 0.1 to 30 wt. %, more preferably 0.5 to 20 wt. %, most preferably 1 to 10 wt. %, of water based on the amount of agricultural composition. When the agricultural composition is diluted with water for use, it preferably comprises 80 to 99.999 wt. % of water wt. %, more preferably 85 to 99.9 wt. %, most preferably 90 to 99 wt. %, of water and a balance of other components, including the agricultural active and the monounsaturated $C_{10}$-$C_{12}$ fatty amine ethoxylate. Of course, the concentrates can be diluted to a lesser degree than the preferred ranges if desired.

The surfactant blend can include one or more auxiliary surfactants, including cationic, anionic, nonionic, amphoteric, or zwitterionic surfactants, provided that they do not interfere with formulation stability or reduce herbicidal effectiveness. Thus, suitable auxiliary surfactants include aminated alkoxylated alcohols, hydroxylated amides, diamines, mono- and diammonium salts, poly(hydroxyalkyl)amines, alkoxylated poly(hydroxyalkyl)amines, alkyl esters of sucrose or sorbitan, alkyl polyglucosides, EO/PO block copolymers, ethoxylated alcohols, ethoxylated alkyl phenols, ethoxylated castor oils, ethoxylated fatty acids, ethoxylated fatty amines, ethoxylated sorbitol esters, glycerol esters, quaternary ammonium compounds, amine oxides, alkoxylated amine oxides, betaines, sulfobetaines, alkylbenzene sulfonates, alpha olefin sulfonates, ether sulfates, phosphate esters, and the like, and mixtures thereof. For additional examples of suitable auxiliary surfactants, see U.S. Pat. Nos. 7,135,437 and 7,049,270, the teachings of which related to surfactant classes are incorporated herein by reference.

Preferred auxiliary surfactants include surfactant blends useful for preparing emulsifiable concentrates. Particularly preferred are blends of tallowamine ethoxylates and alcohol ether sulfates or alkylphenol ether sulfates. Examples of such blends include TOXIMUL® TAAS-8, TOXIMUL® TAABS-5, TOXIMUL® TAABS-8, TOXIMUL® TANS-5, TOXIMUL® TANS-6, TOXIMUL® TANS-8, TOXIMUL® TANS-15, and the like (products of Stepan Company).

Fatty amine oxides and betaines are also preferred as auxiliary surfactants. Suitable amine oxides include those having the formula $R^4R^5R^6N{\rightarrow}O$ wherein $R^4$ is a $C_8$-$C_{24}$, particularly a $C_{12}$-$C_{18}$ straight or branched chain, saturated or unsaturated hydrocarbyl group, such as lauryl, decyl, cetyl, oleyl, stearyl and hexadecyl, or a $R^7CONH(CH_2)_n$ group, wherein $R^7$ is a $C_8$-$C_{24}$, particularly a $C_{12}$-$C_{18}$ straight or branched chain, saturated or unsaturated hydrocarbyl group and n is from 1 to 3; $R^5$ and $R^6$ are independently $C_1$-$C_3$ hydrocarbyl groups such as methyl, ethyl, propyl or substituted $C_1$-$C_3$ hydrocarbyl groups such as hydroxyethyl, hydroxyethoxyethyl and hydroxy polyethoxyethyl. Examples of suitable amine oxides include coconut dimethylamine oxide, capric/capryllic dimethylamine oxide, capric dimethylamine oxide, lauryl dimethylamine oxide, lauryl/myristyl dimethylamidopropylamine oxide, and cocodimethylamidopropylamine oxide. Suitable amine oxides are available commercially as AMMONYX® LD, AMMONYX® CO, AMMONYX® DO, AMMONYX® 810 DO, AMMONYX® MO, and AMMONYX® LMDO, all from Stepan Company. Suitable amine oxides can be made by oxidizing the corresponding amine with hydrogen peroxide or other suitable oxidizing agents using well-known methods. Additional suitable amine oxides are disclosed in U.S. Pat. No. 5,710,103, the teachings of which are incorporated herein by reference.

Suitable betaines have a quaternary nitrogen and carboxylate functionalities, typically separated by one or more alkylene groups. Examples include products available from Stepan Company under the AMPHOSOL® mark, including AMPHOSOL® C series betaines and AMPHOSOL® LB, which is laurylamidopropyl betaine. Other suitable betaines are available from Rhodia under the Geranol™, Mirataine®, or Wettem® marks. For additional examples of suitable betaines, see U.S. Pat. Appl. Publ. No. 2005/0170965, the teachings of which are incorporated herein by reference.

In a preferred aspect, the auxiliary surfactant is selected from fatty amine oxides, fatty betaines, and mixtures thereof.

The agricultural compositions optionally comprise a solvent, preferably a water-miscible solvent. Preferred solvents have the ability to compatibilize the agricultural active, monounsaturated $C_{10}$-$C_{12}$ fatty amine ethoxylate, water, and any auxiliary surfactants. Preferred solvents include, for example, alcohols, glycols, polyalcohols, glycol ethers, esters, glycol ether esters, ketones, amides, polyoxyalkylene glycols, and the like, and mixtures thereof. Glycols, such as propylene glycol, are particularly preferred.

In a particular aspect, the invention relates to an agricultural composition having reduced aquatic toxicity. The composition comprises (a) 20 to 98 wt. %, preferably 50 to 93 wt. %, of a glyphosate salt; (b) 0.1 to 30 wt. %, preferably 3 to 15 wt. %, of a monounsaturated $C_{10}$-$C_{12}$ fatty amine ethoxylate having the structure:

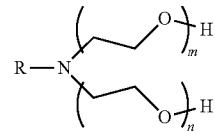

wherein R is linear or branched $C_{10}H_{19}$, $C_{11}H_{21}$, or $C_{12}H_{23}$, each of m and n represents an average number of oxyethylene units, each of m and n is at least 1, and m+n has a value from 2 to 7; (c) 0.1 to 30 wt. %, preferably 1 to 10 wt. %, of water; (d) optionally, an auxiliary surfactant; and (e) optionally, a solvent. Additionally, the fatty amine ethoxylate has at most slight aquatic toxicity as measured in the Acute Mobilization Test as reflected by a 48-hour $EC_{50}$ value with *Daphnia magna* greater than or equal to 10 mg/L.

In another particular aspect, the invention relates to a dilute agricultural composition having reduced aquatic toxicity. The composition comprises: (a) 1 ppm to 10 wt. %, preferably 10 ppm to 1 wt. %, of a glyphosate salt; (b) 1 ppm to 10 wt. %, preferably 10 ppm to 1 wt. %, of a monounsaturated $C_{10}$-$C_{12}$ fatty amine ethoxylate having the structure:

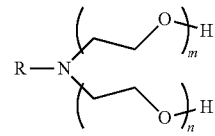

wherein R is linear or branched $C_{10}H_{19}$, $C_{11}H_{21}$, or $C_{12}H_{23}$, each of m and n represents an average number of oxyethylene units, each of m and n is at least 1, and m+n has a value from 2 to 7; (c) 80 to 99.999 wt. %, preferably 85 to 99.9 wt. %, of water; (d) optionally, an auxiliary surfactant; and (e) optionally, a solvent. Additionally, the fatty amine ethoxylate has at most slight aquatic toxicity as measured in the Acute Mobilization Test as reflected by a 48-hour $EC_{50}$ value with *Daphnia magna* greater than or equal to 10 mg/L.

The inventive compositions offer comparable herbicidal efficacy to similar formulations that incorporate analogous saturated fatty amine ethoxylates. Surprisingly, however, formulations comprising the monounsaturated $C_{10}$-$C_{12}$ fatty amine ethoxylates have a reduced level of aquatic toxicity when compared with analogous formulations that incorporate saturated fatty amine ethoxylates. We found that monounsaturated $C_{10}$-$C_{12}$ fatty amine ethoxylates are about an order of magnitude less toxic than their saturated analogs. Preferably, the agricultural compositions comprise a fatty amine ethoxylate having at most slight aquatic toxicity as measured in the Acute Mobilization Test as reflected by a 48-hour $EC_{50}$ value (i.e., the 48-hour half maximal effective concentration) with *Daphnia magna* greater than or equal to 10 mg/L. More preferred are compositions in which the amine ethoxylate has a 48-hour $EC_{50}$ value greater than or equal to 15 mg/L.

The following examples merely illustrate the invention. Those skilled in the art will recognize many variations that are within the spirit of the invention and scope of the claims.

Preparation of Amine Ethoxylates

A 600-mL stainless-steel pressure reactor equipped with an air-driven stirrer and cooling coil is charged with a desired amount of $C_{11}$ saturated or unsaturated amine, and the reactor is sealed. The reactor is evacuated and purged with nitrogen, then heated to 150° C. Ethylene oxide is transferred from a tared lecture bottle to a day tank, then metered to the reactor while maintaining a reactor pressure below 80 psi. Ethylene oxide (1.8-2.0 moles per mole of fatty amine) is added while keeping the reaction temperature within the range of 145° C. to 160° C. When the reaction is complete, a portion of the reaction mixture is drained to give the 2 mole ethoxylate. Potassium hydroxide is then added and the reaction mixture is vacuum stripped. Additional ethylene oxide is added to produce amine ethoxylates having an average of 5 or 7 moles of EO per mole of fatty amine. The degree of ethoxylation is confirmed by measuring an amine value at each step of the process.

Glyphosate Formulations

Example 1

A 540 g/L a.e. glyphosate formulation is prepared by combining potassium glyphosate (47.5% a.e., 83.8 wt. % in the finished formulation) with a monounsaturated $C_{11}$ fatty amine 2EO ethoxylate (8.0 wt. %) under mechanical stirring in a suitable container at room temperature. Deionized water (8.2 wt. %) is added to generate a composition having 39.8% a.e. of potassium glyphosate.

Comparative Example 2

Example 1 is repeated, except that the monounsaturated amine ethoxylate is replaced with the same amount of a saturated $C_{11}$ fatty amine 2EO ethoxylate.

Example 3

A 540 g/L a.e. glyphosate formulation is prepared by combining potassium glyphosate (47.5% a.e., 83.8 wt. % in the finished formulation) with a monounsaturated $C_{11}$ fatty amine 5EO ethoxylate (6.0 wt. %) and laurylamine oxide (2.0 wt. %) under mechanical stirring in a suitable container at room temperature. Deionized water (8.2 wt. %) is added to generate a composition having 39.8% a.e. of potassium glyphosate.

Comparative Example 4

Example 3 is repeated, except that the monounsaturated amine ethoxylate is replaced with the same amount of a saturated $C_{11}$ fatty amine 5EO ethoxylate.

Aquatic Toxicity Screen Testing

Aquatic toxicity of the saturated $C_{11}$ fatty amine 5EO ethoxylate and the unsaturated $C_{11}$ fatty amine 5EO ethoxylate on the Cladoceran, *Daphnia magna*, is evaluated during a 48-hour exposure period under static test conditions. The study is performed based on procedures in the OECD Guidelines for Testing of Chemicals, Guideline 202: *Daphnia* sp., Acute Immobilization Test, and U.S. EPA Guidelines, OPPTS Number 850.1010: Aquatic Invertebrate Acute Toxicity Test. The half maximal effective concentration ($EC_{50}$) after 48 hours is reported below.

48-Hour $EC_{50}$ Results:

Saturated $C_{11}$ amine 5EO ethoxylate: 3.3 mg/L (moderately toxic)

Unsaturated $C_{11}$ amine 5 EO ethoxylate: 20 mg/L (slightly toxic).

The results indicate that the monounsaturated amine ethoxylate is more than one order of magnitude (i.e., more than 10×) less toxic toward *Daphnia magna* in the standard test.

Agricultural Field Testing

Amine ethoxylates are evaluated as adjuvants for glyphosate formulations in agricultural field tests performed by an independent laboratory. The weed species included in the evaluation are common lambsquarters (CHEAL), barnyard grass (ECHCG), and wild oat (AVEFA).

Adjuvants:

The identity of the adjuvants tested is not revealed to the independent laboratory. Two of the adjuvants (Agents A and B) include an unsaturated fatty amine ethoxylate, and the comparative adjuvants (Comparative Agents C and D) include a saturated fatty amine ethoxylate:

(1) Agent A, a mixture of a $C_{11}$ unsaturated fatty amine 5EO ethoxylate (75 wt. %) and AMMONYX LO (lauryl amine oxide, product of Stepan, 25 wt. %);

(2) Agent B, a $C_{11}$ unsaturated fatty amine 2EO ethoxylate;

(3) Comparative Agent C, a mixture of a $C_{11}$ saturated fatty amine 5EO ethoxylate (87.5 wt. %) and AMMONYX LO (12.5 wt. %); and (4) Comparative Agent D, a $C_{11}$ saturated fatty amine 2EO ethoxylate.

Plant Material:

Two field trials are conducted in the Netherlands during the summer. In the first trial, common lambsquarters (CHEAL, *Chenopodium album*), barnyard grass (ECHCG, *Echinochloa* crus-galls) and wild oat (AVEFA, *Avena fatua*) are sown in three distinct zones of the same size in a 4×2 m field plot. Other emerging weed species are removed by hand as needed. Five weeks after sowing, the plots are treated and weed control is visually assessed 8, 14, and 22 days after treatment (DAT). Visual assessment is used with a scale of 0=no effect to 100=complete kill. Growth reduction is included in this assessment. On the day of treatment, ECHCG has more than six leaves, and CHEAL has at least six unfolded leaves. A second test with AVEFA alone is conducted because the level of emergence was too low in the first test. (Results from the first AVEFA testing are not included.) AVEFA is at the 3-leaf stage on the day of treatment. The plots are visually evaluated 9 and 23 days after treatment.

Glyphosate Treatment Solutions:

A glyphosate potassium solution (540 g.a.e./L) without surfactants or other adjuvant chemicals is used to prepare solutions that contain the adjuvants listed in Table 2A. Roundup® Powermax® (540 g.a.e./L, product of Monsanto) is used as a control. The glyphosate solutions are diluted with deionized water such that application at a water volume of 80 L/ha results in a glyphosate application rate of 480 g.a.e./ha. Adjuvants are included in the diluted glyphosate solution at a ratio of 160 g adjuvant per 540 g.a.e. glyphosate. In this way, commercial glyphosate products containing glyphosate at 540 g.a.e./L and adjuvant at 160 g/L are simulated.

Herbicide Application:

Glyphosate solutions are applied with a backpack sprayer having a TeeJet® TP8003E nozzle set to deliver 80 L/ha at 150 kPa. The application with the first trial started early in the morning in mid-summer. Conditions: sunny skies, relative humidity 80%, temperature 18° C., little or no wind, wet soil, damp foliage. Application of AVEFA trial starts in early autumn late in the afternoon. Conditions: partly cloudy, relative humidity 79%, temperature 15° C., little or no wind, wet soil, dry foliage.

Results:

As shown in Table 1, adjuvants containing either the saturated or unsaturated fatty amine ethoxylates generally perform as well as or better than the Roundup® Powermax® control. Agent B, the $C_{11}$ unsaturated fatty amine 2EO ethoxylate, provides the best overall performance of the group.

CHEAL:

Twenty-two days after treatment (22 DAT), treatments with Agent B and Comparative Agents C and D show the same performance as Roundup Powermax. At 8 and 14 DAT, these treatments outperform the control. Agent A is somewhat less effective than the control.

ECHCG:

Agents A and B and Comparative Agents C and D outperform Roundup Powermax at 22 DAT, with Agent B as the top performer.

AVEFA:

All of the adjuvants provide good weed control (23 DAT).

The results in Table 1 indicate limited differentiation among the adjuvants in the field tests. The glyphosate rate applied (480 g.a.e./ha) is about three times lower than the normally applied rate, so one should expect less differentiation at normal field rates.

AVEFA is more susceptible to glyphosate than CHEAL and ECHCG, which is evidenced by a lower level of differentiation between adjuvants. The late-season AVEFA trial gave smaller plants on the day of treatment, which could also contribute to a low level of adjuvant differentiation.

The field trials demonstrate that all of the amine ethoxylates perform as well as or better than the Roundup® Powermax® control. The monounsaturated amine ethoxylates perform at least as well as their saturated analogs when used as adjuvants in glyphosate formulations. Interestingly, the $C_{11}$ unsaturated 2EO ethoxylate outperforms its saturated analog in a direct comparison.

On balance, because performance in the field testing is excellent with all of the amine ethoxylates, the far lower aquatic toxicity of the monounsaturated amine ethoxylates tilts the balance in favor of agricultural compositions containing them.

The preceding examples are meant only as illustrations. The following claims define the invention.

TABLE 1

Results of Field Testing with Glyphosate and Fatty Amine Ethoxylate Adjuvants

| | CHEAL | | | ECHCG | | | AVEFA | |
|---|---|---|---|---|---|---|---|---|
| | 8 DAT, % | 14 DAT, % | 22 DAT, % | 8 DAT, % | 14 DAT, % | 22 DAT, % | 9 DAT, % | 23 DAT, % |
| Agent A | 52.5 | 88.8 | 92.5 | 80.0 | 88.8 | 100 | 85.0 | 100 |
| Agent B | 86.7 | 97.7 | 96.7 | 100 | 97.7 | 100 | 87.5 | 100 |
| Comparative Agent C | 82.5 | 88.8 | 72.5 | 92.5 | 88.8 | 100 | 90.0 | 100 |
| Comparative Agent D | 75.0 | 91.3 | 92.5 | 97.5 | 91.3 | 100 | 82.5 | 100 |
| Roundup ® Powermax ® | 72.5 | 82.0 | 100 | 80.0 | 82.0 | 77.5 | 90.0 | 100 |

We claim:

1. An agricultural composition having reduced aquatic toxicity, comprising:
   (a) an agricultural active;
   (b) a monounsaturated $C_{11}$ fatty amine ethoxylate, wherein the fatty amine ethoxylate has the structure:

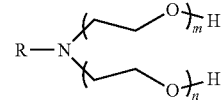

wherein R is linear or branched $C_{11}H_{21}$, each of m and n represents an average number of oxyethylene units, each of m and n is at least 1, and m+n has a value from 2 to 7;
   (c) optionally, water;
   (d) optionally, an auxiliary surfactant; and
   (e) optionally, a solvent;
   and wherein the fatty amine ethoxylate has at most slight aquatic toxicity as measured in the Acute Mobilization Test as reflected by a 48-hour $EC_{50}$ value with *Daphnia magna* greater than or equal to 10 mg/L.

2. The composition of claim 1 wherein the 48-hour $EC_{50}$ value with *Daphnia magna* is greater than or equal to 15 mg/L.

3. The composition of claim 1 wherein the agricultural active is a glyphosate salt.

4. The composition of claim 3 comprising at least 30 wt. % acid equivalents of the glyphosate salt.

5. The composition of claim 1 comprising 0.5 to 20 wt. % of the fatty amine ethoxylate.

6. The composition of claim 1 wherein m+n has a value from 4 to 6.

7. The composition of claim 1 wherein m+n is 2.

8. The composition of claim 1 wherein m+n is 5.

9. The composition of claim 1 wherein the auxiliary surfactant is selected from the group consisting of fatty amine oxides, fatty betaines, and mixtures thereof.

10. The composition of claim 1 wherein the solvent is propylene glycol.

11. The composition of claim 1 comprising 20 to 98 wt. % of the agricultural active, 0.1 to 30 wt. % of the monounsaturated $C_{11}$ fatty amine ethoxylate, and 0.1 to 30 wt. % of water.

12. The composition of claim 11 wherein the agricultural active is a glyphosate salt.

13. An agricultural composition having reduced aquatic toxicity, comprising:
(a) 20 to 98 wt. % of a glyphosate salt;
(b) 0.1 to 30 wt. % of a monounsaturated $C_{11}$ fatty amine ethoxylate having the structure:

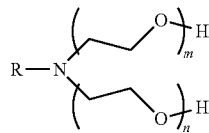

wherein R is linear or branched $C_{11}H_{21}$, each of m and n represents an average number of oxyethylene units, each of m and n is at least 1, and m+n has a value from 2 to 7;
(c) 0.1 to 30 wt. % of water;
(d) optionally, an auxiliary surfactant; and
(e) optionally, a solvent;
wherein the fatty amine ethoxylate has at most slight aquatic toxicity as measured in the Acute Mobilization Test as reflected by a 48-hour $EC_{50}$ value with *Daphnia magna* greater than or equal to 10 mg/L.

14. The composition of claim 13 comprising 50 to 93 wt. % of the glyphosate salt, 3 to 15 wt. % of the monounsaturated $C_{11}$ fatty amine ethoxylate, and 1 to 10 wt. % of water.

15. A dilute agricultural composition having reduced aquatic toxicity, comprising:
(a) 1 ppm to 10 wt. % of a glyphosate salt;
(b) 1 ppm to 10 wt. % of a monounsaturated $C_{11}$ fatty amine ethoxylate having the structure:

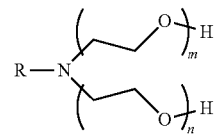

wherein R is linear or branched $C_{11}H_{21}$, each of m and n represents an average number of oxyethylene units, each of m and n is at least 1, and m+n has a value from 2 to 7;
(c) 80 to 99.999 wt. % of water;
(d) optionally, an auxiliary surfactant; and
(e) optionally, a solvent;
wherein the fatty amine ethoxylate has at most slight aquatic toxicity as measured in the Acute Mobilization Test as reflected by a 48-hour $EC_{50}$ value with *Daphnia magna* greater than or equal to 10 mg/L.

16. The composition of claim 15 comprising 10 ppm to 1 wt. % of the glyphosate salt, 10 ppm to 1 wt. % of the monounsaturated $C_{11}$ fatty amine ethoxylate, and 85 to 99.9 wt. % of water.

* * * * *